United States Patent
Desai et al.

(10) Patent No.: US 11,288,513 B1
(45) Date of Patent: Mar. 29, 2022

(54) PREDICTIVE IMAGE ANALYSIS

(71) Applicant: Amazon Technologies, Inc., Seattle, WA (US)

(72) Inventors: Chintan Desai, Bellevue, WA (US); Tarun Venkatesh Ravva, Bothell, WA (US); Yen-Yi Lai, Seattle, WA (US); Prathyusha Moparthi, Bothell, WA (US); Tong Wang, Bothell, WA (US); Anthony Payauys, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 16/675,383

(22) Filed: Nov. 6, 2019

(51) Int. Cl.
| | | |
|---|---|---|
| *G06K 9/00* | (2006.01) | |
| *G06K 9/72* | (2006.01) | |
| *G06K 9/46* | (2006.01) | |
| *G06F 40/30* | (2020.01) | |
| *G10L 15/22* | (2006.01) | |
| *G10L 15/18* | (2013.01) | |
| *G10L 13/00* | (2006.01) | |

(52) U.S. Cl.
CPC ......... *G06K 9/00718* (2013.01); *G06F 40/30* (2020.01); *G06K 9/46* (2013.01); *G06K 9/726* (2013.01); *G06K 2209/01* (2013.01); *G10L 13/00* (2013.01); *G10L 15/1815* (2013.01); *G10L 15/22* (2013.01); *G10L 2015/223* (2013.01)

(58) Field of Classification Search
CPC ...... G06K 9/00718; G06K 9/46; G06K 9/726; G06F 40/30
See application file for complete search history.

(56) References Cited

U.S. PATENT DOCUMENTS

| | | | | |
|---|---|---|---|---|
| 2007/0199039 | A1* | 8/2007 | Diroo | H04N 21/8153 |
| | | | | 725/134 |
| 2013/0232419 | A1* | 9/2013 | Yates | G06F 3/0484 |
| | | | | 715/723 |
| 2014/0184919 | A1* | 7/2014 | Yoshida | H04N 5/63 |
| | | | | 348/725 |
| 2016/0350386 | A1* | 12/2016 | Zhu | G06F 16/248 |
| 2017/0011351 | A1* | 1/2017 | Jones-Mcfadden | |
| | | | | G06F 3/0484 |
| 2019/0207996 | A1* | 7/2019 | Sehgal | H04N 21/234 |
| 2020/0213676 | A1* | 7/2020 | Naik Raikar | H04N 21/2387 |
| 2020/0334468 | A1* | 10/2020 | Agarwal | G06K 9/6256 |

* cited by examiner

*Primary Examiner* — Kevin Ky
(74) *Attorney, Agent, or Firm* — Pierce Atwood LLP

(57) ABSTRACT

Described herein is a system for predictive image analysis to provide a response to a user input. To reduce a system response time when responding to user inputs that relate to image data analysis, the system processes data relating to past user inputs to predict when a user may request information relating to image data. Using pattern data (determined by the system), the system determines that a trigger to initiate image analysis occurred. The trigger may indicate that the system is expected to receive a user input relating to image data. The system processes image data, in advance of receiving the user input, to determine and store feature data that can be used to generate an output responsive to a user input. Then when the user input is received, the system sends output data (generated using the determined feature data) responsive to the user input.

20 Claims, 9 Drawing Sheets

PREDICTIVE IMAGE ANALYSIS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input audio data is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
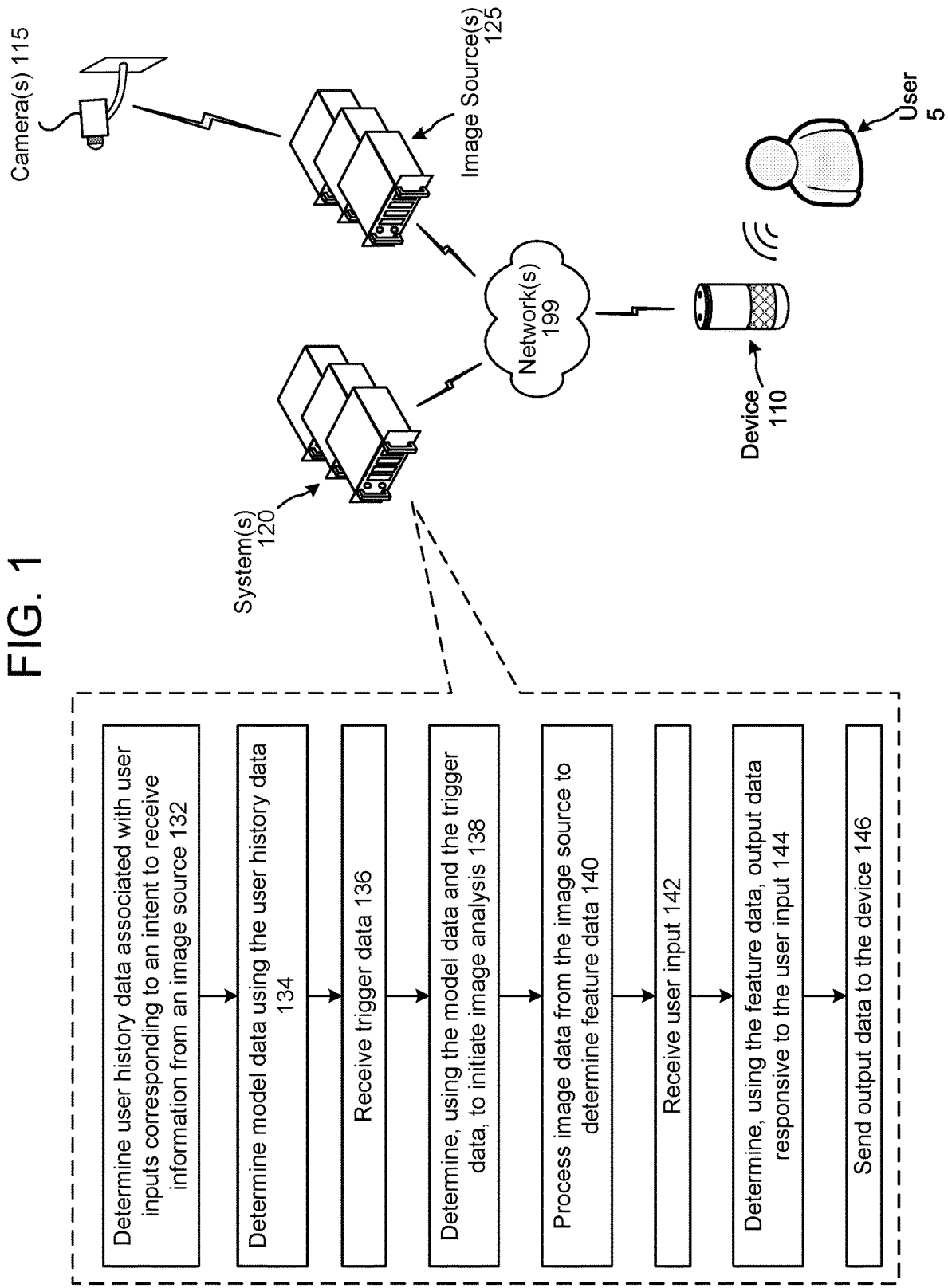
FIG. 1 illustrates a system configured to process image data in advance of a user input according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech. Computer vision is a field of computer science concerned with gaining high-level understanding from digital images and videos.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John." In yet further example, for the user input of "Alexa, how is the traffic," a system may output synthesized speech representing traffic information for a geographic location of the user, where the traffic information may be determined by processing images and/or videos from traffic cameras.

Computer vision tasks include methods for acquiring, processing, analyzing and understanding digital images, and extraction of high-dimensional data from the real world in order to produce numerical or other symbolic information, for example in the form of decisions. Understanding in this context means the transformation of visual images into natural language descriptions that can convey information to a user about the visual images. This image understanding can be seen as the disentangling of symbolic information from image data using models constructed with the aid of geometry, physics, statistics, and learning theory.

The scientific discipline of computer vision is concerned with the theory behind artificial systems that extract information from images. The image data can take many forms, such as images, video sequences or views from multiple cameras. The technological discipline of computer vision seeks to apply its theories and models to the construction of computer vision systems. Sub-domains of computer vision include scene reconstruction, event detection, video tracking, object recognition, 3D pose estimation, learning, indexing, motion estimation, image restoration and the like.

The present system enables a user to request information related to images and videos. For example, a user may request traffic information and the system may process images and videos from traffic cameras using computer vision algorithms to determine the traffic information. In a further example, a user may request information relating to images captured by a publicly available image source, such as the Panda Cam made available by the Smithsonian's National Zoo. The system may process the images and videos from the Panda Cam using a computer vision algorithm and may determine a video summary to provide to the user. In yet a further example, a user may request information relating to images and videos captured by device(s) (e.g., security cameras, home monitoring devices, etc.) within the user's home to determine, for example, whether a person is at home, whether certain events occurred at home, etc. The system may process the images and videos from the home device(s) using a computer vision algorithm and may determine an output (e.g., visual output, textual output, speech output, etc.) responsive to the user's request.

Due to the resources and time needed to execute computer vision algorithms, the user ma experience some delay in receiving a response to the request. To reduce the response time for such requests, the present system may process images and videos in advance of receiving a user request. The present system may predict when a user may request information relating to images and videos, and this prediction may be based on data relating to past user inputs, such as at what time does the system typically receives such requests from the user, where is the user located when the system typically receives such requests, what event has occurred when the system typically receives such requests, and the like. The present system may initiate image and video processing using a computer vision algorithm based on a trigger indicating that the system may expect such a user request within a short time period. The present system may also initiate image and video processing based on the processing latency of the computer vision algorithm, to reduce the response time to the user request.

The present system may provide a more desirable user experience. This is due to the system reducing the time to respond to a user's request that requires image analysis. The present system may process images and videos in advance of a user request and store corresponding features that can be used to generate an output responsive to the user request. Thus, the system reduces the time to respond by using pre-processed image data to respond to the user request.

FIG. 1 illustrates a system configured to process image data in advance of a user input according to embodiments of the present disclosure. As illustrated in FIG. 1, the system may include a device 110 local to a user 5, one or more systems 120, and one or more image sources 125 connected across one or more networks 199. The system may also include one or more cameras 115 connected to the image source(s) 125.

The system(s) 120 determines (132) user history data associated with user inputs corresponding to an intent to receive information from an image source 125. The user history data may include data relating to past user requests and inputs, where the past user requests required the system(s) 120 to retrieve image data from a particular image source 125 and perform image analysis. The user history data may include timestamp data indicating when each of the past user requests were received, location data indicating where the user was located when providing the past user requests, event data indicating occurrence of one or more events when the user provided the past user request or in response to which the provided the past user request. The user history data may also include other data that can be used by the system(s) 120 to predict when the system can expect the particular type of user request.

The system(s) 120 determines (134) model data using the user history data. The system(s) 120 may process the user history data using one or more trained models to determine model data to predict a likelihood of receiving a user request corresponding to the intent to receive information from the image source 125. Further details of determining the model data are described in relation to FIG. 4.

The system(s) 120 receives (136) trigger data. The trigger data may include input data representing the present context/ situation/conditions relating to the device 110 and/or the user 5 that can be used to determine if the present situation should be used to initiate image analysis. For example, the trigger data may include the present time or present timestamp data, present location of the user, present event data (e.g., occurrence of an event, on-going event, etc.) and other data.

The system(s) 120 determines, using the model data and the trigger data, to initiate image analysis. The system(s) 120 may determine if the trigger data meets a condition or threshold with respect to the data represented by the model data, and the system(s) 120 may also determine if there is a high probability of receiving a user request with respect to the situation/context indicated by the trigger data. Further details of how the image analysis is triggered are described in relation to FIG. 4. The system(s) 120 may determine to initiate image analysis in advance of receiving a user input requesting information relating to the image data.

The system(s) 120 processes (140) image data from the image source 125 to determine feature data associated with the image data. The system(s) 120 may perform computer vision processing using the image data to determine the feature data. The image source 125 may store image data captured by the camera(s) 115. The system(s) 120 may retrieve image data from the appropriate image source 125 based on the user request the system(s) 120 is expecting to receive.

The system(s) 120 may perform the operations 132 and 134 during a first time period, for example, during a training/ offline operation. The system(s) 120 may perform the operations 136, 140 and 142 during a second time period, for example, in advance of when the system(s) 120 predicts that it will receive a user input corresponding to the intent to receive information from the image source 125.

The system(s) 120 receives (142) a user input from the user 5 via the device 110. The system(s) 120 may receive the user input during a third time period, after the feature data has been determined by the system(s) 120. The user input may be audio data representing an utterance spoken by the user 5 and captured by the device 110. The system(s) 120 may perform ASR processing using the audio data to determine text data corresponding to the utterance. Details on how the system performs ASR processing are described below. The system(s) 120 may perform NLU processing on the text data to determine an intent corresponding to the user input. Details on how the system performs NLU processing are described below. The system(s) 120 may determine, using NLU data, that the image data processed in operation 140 is responsive to the user input.

The system(s) 120 determines (144), using the feature data, output data responsive to the user input. Details on how the system(s) 120 determines the output data are described in relation to FIG. 4. In some embodiments, the system(s) 120 may determine the output data prior to receiving the user input. The system(s) 120 sends (146) output data to the device 110 to respond to the user input.

Figure 2:
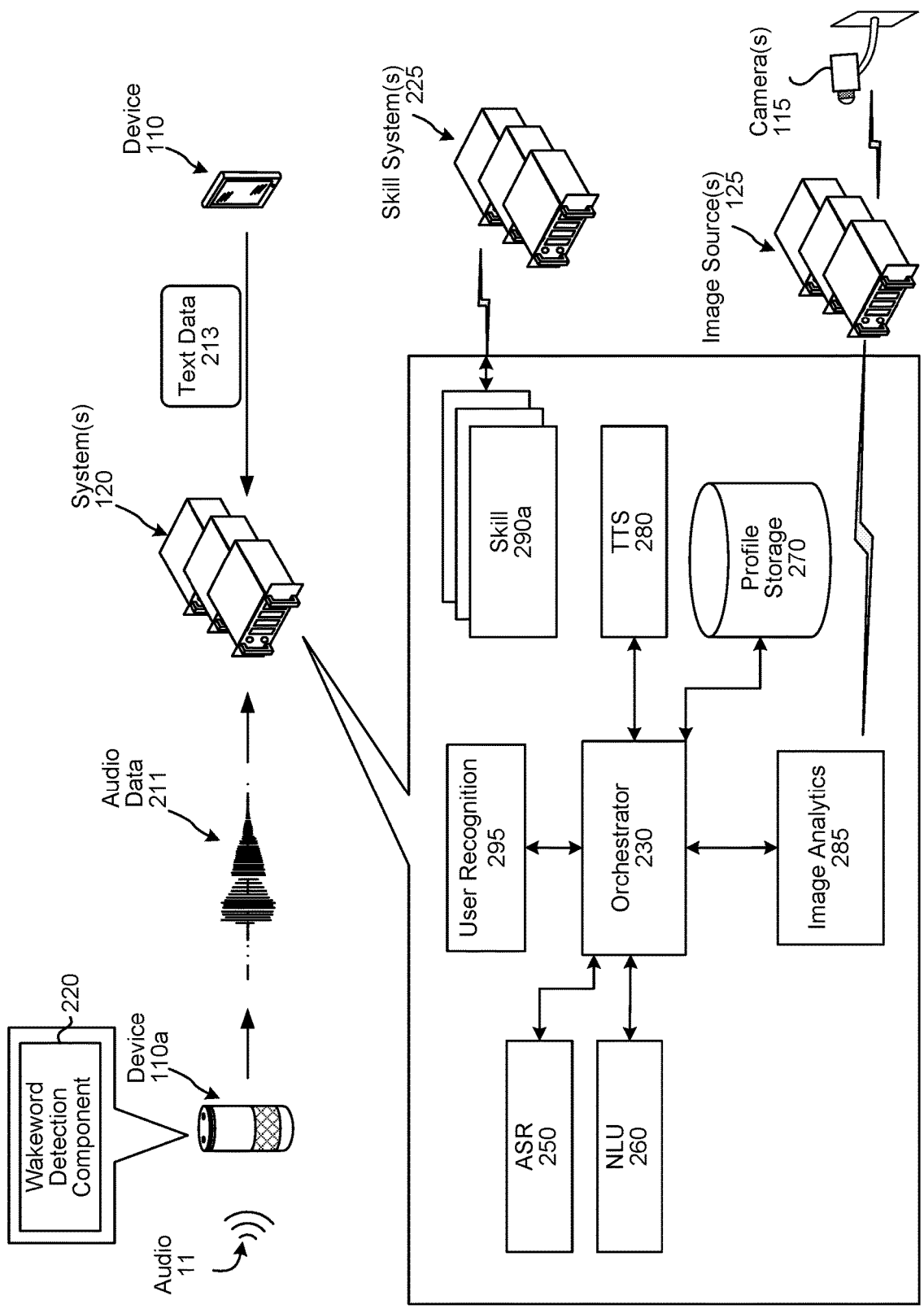
FIG. 2 is a conceptual diagram of components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the system(s) 120. The audio data 211 may include data corresponding to the wakeword, or the device 110a may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The orchestrator component 230 may send text data (e.g., text data output by the ASR component 250) to an NLU component 260.

The device 110 may send text data 213 to the server(s) 120. Upon receipt by the server(s) 120, the text data 213 may be sent to the orchestrator component 230, which may send the text data 213 to the NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 125, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 125. Such may enable a skill system(s) 125 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 125.

Unless expressly stated otherwise, reference to a skill, skill device, skill component, or the like herein may include a skill 290 operated by the system(s) 120 and/or skill operated by the skill system(s) 125. Moreover, the functionality described herein as a skill may be referred to using many different terms, such as an action, bot, app, or the like.

The system(s) 120 may include a post-NLU ranker that receives NLU results data and determines (as described in detail herein) which skill the system(s) 120 should invoke to execute with respect to the user input. The post-NLU ranker may be implemented separately from the orchestrator component 230 (as illustrated) or one or more components of the post-NLU ranker may be implemented as part of the orchestrator component 230.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. A word result network may consist of sequences of words that may be recognized and the likelihood of each sequence. The likelihood of any path in the word result network may be determined by an acoustic model and a language model.

The ASR engine 258 may return an N-best list of paths along with their respective recognition scores, corresponding to the top N paths as determined by the ASR engine 258. An application (such as a program or component either internal or external to the ASR component 250) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The system(s) 120 may also include an image analytics component 285. The image analytics component 285 may be configured to predict when the system may receive a user request requiring video and image analysis and trigger image analysis in advance of receiving the user request.

Figure 3:
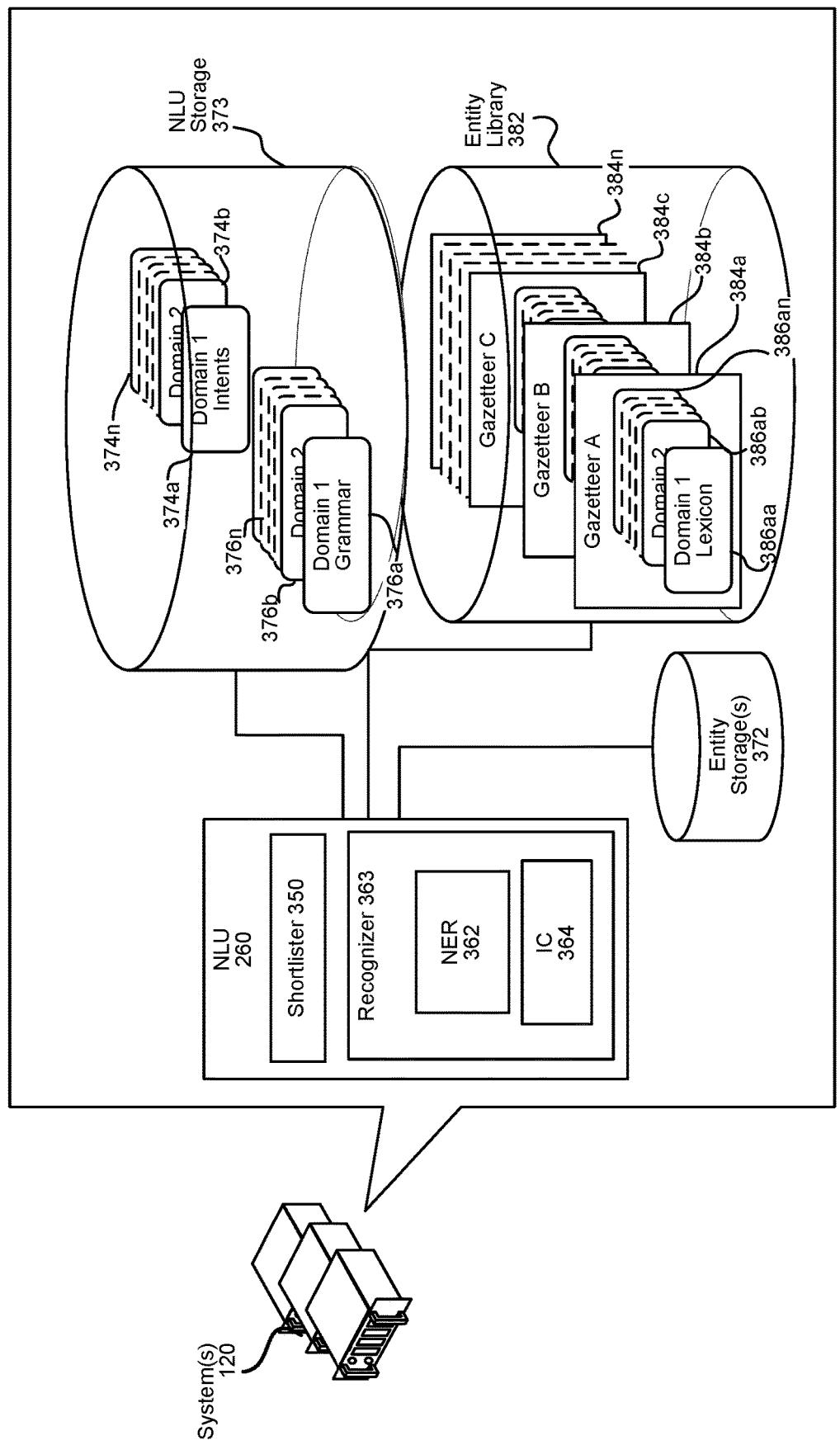
FIG. 3 is a conceptual diagram illustrating how NLU processing may be performed according to embodiments of the present disclosure.

FIG. 3 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 350. The shortlister component 350 selects skills that may execute with respect to text data input to the NLU component 260 (e.g., applications that may execute with respect to the user input). The shortlister component 350 thus limits downstream, more resource intensive NLU processes to being performed with respect to skills that may execute with respect to the user input.

Without a shortlister component 350, the NLU component 260 may process text data input thereto with respect to every skill of the system, either in parallel, in series, or using some combination thereof. By implementing a shortlister component 350, the NLU component 260 may process text data with respect to only the skills that may execute with respect to the user input. This reduces total compute power and latency attributed to NLU processing.

The shortlister component 350 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to

[location]," "book me a cab to [location]," "book me a ride to [location]," etc. The one or more trained models that will be used by the shortlister component 350 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 350 may be trained with respect to a different skill. Alternatively, the shortlister component 350 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 350. For example, some sample user inputs may be positive examples (e.g., user inputs that may be used to invoke the skill). Other sample user inputs may be negative examples (e.g., user inputs that may not be used to invoke the skill).

As described above, the shortlister component 350 may include a different trained model for each skill of the system, a different trained model for each domain, or some other combination of trained model(s). For example, the shortlister component 350 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 350 to output indications of only a portion of the skills that the text data may relate to. For example, a user input may correspond to "tell me about Tom Collins." If the model is clustered based on domain, the shortlister component 350 may determine the user input corresponds to a recipe skill (e.g., a drink recipe) even though the user input may also correspond to an information skill (e.g., including information about a person named Tom Collins).

Training the shortlister component 350 may require establishing a "ground truth" for the training examples input therein. The shortlister component 350 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 260 may include one or more recognizers 363. Each recognizer 363 may be associated with a different domain (e.g., smart home, video, music, weather, custom, etc.).

If the shortlister component 350 determines text data is potentially associated with multiple domains, the recognizers 363 associated with the domains may process the text data, while recognizers 363 not indicated in the shortlister component 350's output may not process the text data. The "shortlisted" recognizers 363 may process the text data in parallel, in series, partially in parallel, etc. For example, if text data potentially relates to both a communications domain and a music domain, a recognizer associated with the communications domain may process the text data in parallel, or partially in parallel, with a recognizer associated with the music domain processing the text data.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity associated with a domain, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora, or the like.

Each recognizer 363, and more specifically each NER component 362, may be associated with a particular grammar database 376, a particular set of intents/actions 374, and a particular personalized lexicon 386. Each gazetteer 384 may include domain-indexed lexical information associated with a particular user and/or device 110. For example, a Gazetteer A (384a) includes domain-indexed lexical information 386aa to 386an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 362 applies grammar information 376 and lexical information 386 associated with a domain (associated with the recognizer 363 implementing the NER component 362) to determine a mention of one or more entities in text data. In this manner, the NER component 362 identifies "slots" (each corresponding to one or more particular words in text data) that may be useful for later processing. The NER component 362 may also label each slot with a type (e.g., noun, place, city, artist name, song name, etc.).

Each grammar database 376 includes the names of entities (i.e., nouns) commonly found in speech about the particular domain to which the grammar database 376 relates, whereas the lexical information 386 is personalized to the user and/or the device 110 from which the user input originated. For example, a grammar database 376 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (384a-384n) stored in an entity library storage 382. The gazetteer information 384 may be used to match text data (representing a portion of the user input) with text data representing known entities, such as song titles, contact names, etc. Gazetteers 384 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 363 may also include an intent classification (IC) component 364. An IC component 364 parses text data to determine an intent(s) (associated with the domain associated with the recognizer 363 implementing the IC component 364) that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data (representing at least a portion of the user input) to the words and phrases in an intents database 374 (associated with the domain that is associated with the recognizer 363 implementing the IC component 364).

The intents identifiable by a specific IC component 364 are linked to domain-specific (i.e., the domain associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 276 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the domain associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as Hidden Markov Models, maximum entropy models, log linear models, conditional random fields (CRF), and the like. For example, an NER component 362 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer) may determine corresponds to a <PlayMusic> intent. At this stage, no determination has been made as to the meaning of "mother's little helper" or "the rolling stones," but based on grammar rules and models, the NER component 362 has determined the text of these phrases relates to the grammatical object (i.e., entity) of the user input represented in the text data.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

In some embodiments, the recognizer 363 may be configured to perform predictive entity resolution (process of linking a slot of the user input to a specific entity known to the system) based on the trigger data indicating that image analysis should be initiated. The recognizer 363 may use the input data (used to trigger image analysis) and data indicating which image source and output is to be generated in response to a future user input to map certain ambiguous user inputs. That is, the recognizer 363 may be configured to, in view of the image analysis component 285 determining that there is high likelihood of the user requesting a particular output requiring image analysis using data from a particular image source, determine that there is a high likelihood that the ambiguous user input corresponds to a request for image data from the particular image source, and map the user input to the particular image source entity. For example, the recognizer 363 may be able to perform entity resolution for otherwise ambiguous user inputs, such as, "show me the traffic cameras," "what does the commute look like," "how are the roads right now," etc. based on the data used to initiate image analysis as described herein, and may map such user inputs to the particular traffic camera/image source entity that is determined by the image analysis component 285 to retrieve image data from to respond to such user inputs. In another example, the recognizer 363 may map user inputs such as "how are my plants", "how are my tomatoes", "do I need water my plants", etc. to the particular home device/camera entity that is determined by the image analysis component 285 for retrieving image data to respond to such user inputs.

Figure 4:
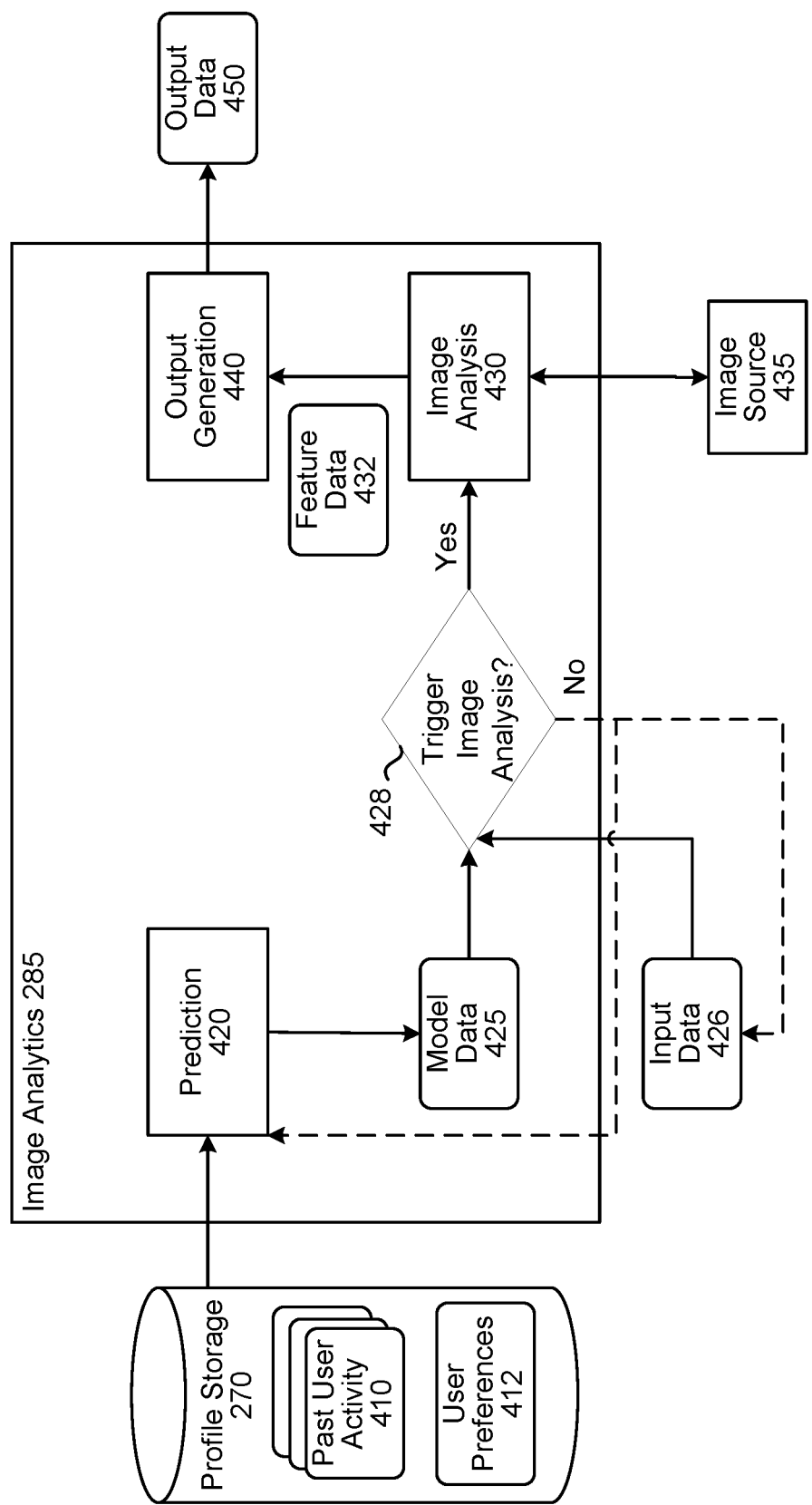
FIG. 4 is a conceptual diagram illustrating components of the image analytics component that the system can use according to embodiments of the present disclosure.

FIG. 4 is a conceptual diagram illustrating components of the image analytics component 285 that the system can use according to embodiments of the present disclosure. The image analytics component 285 is configured to predict when the system may receive a user request requiring video and image analysis and trigger image analysis in advance of receiving the user request. The image analytics component 285 may include a prediction component 420, an image analysis component 430 and an output generation component 440.

The prediction component 420 may be configured to process past user activity and past user inputs to determine a prediction model to predict when the system(s) 120 may receive a user request requiring image analysis. The prediction component 430 may receive data from the profile storage 270, such as past user activity data 410 and user preferences data 412. The past user activity data 410 may include data relating to past user requests and inputs, where the past user requests required the system(s) 120 to retrieve image data from a particular image source and perform image analysis. For example, the past user requests may be related to traffic information, such as "how is the traffic?" or "what is going with traffic right now?" etc. The past user activity data 410 may include timestamp data indicating when each of the past user requests were received. For example, the past user activity data 410 may include the text data representing a first past user request and a first timestamp when it was received (e.g., Monday, Jan. 1, 2019, 8:45 am EST). In some embodiments, the timestamp data may be more general and may indicate the day of the week and general time of the day the past user request was received, for example, Monday morning. In some embodiments, the prediction component 420 may determine 'time bins' using the timestamp data to generalize when the past user request was received. For example, using the first timestamp Monday, Jan. 1, 2019, 8:45 am EST, the prediction component 420 may associate a first time bin of "Monday morning" with the first past user input. Similarly, the past user activity data 420 may include text data representing a second past user request and a second timestamp indicating when the second past user request was received by the system(s) 120.

The past user activity data 410 may also include location data indicating where the user was located when providing the user request. The location data may be determined based on the location of the device 110 that captures the user request. The location data may also be determined using other location determination techniques, such as GPS data associated with other device(s) being carried or approximate to the user. The location data may be GPS coordinates, an address, a user-identified name for the location (e.g., a user may assign the name "work" to a particular address), etc. For example, the past user activity data 410 may include first location data associated with the first past user request, where the first location data indicates the user was at home in his car when requesting traffic information. Similarly, the past user activity data 410 may include second location data associated with the second past user request, where the second location data indicates the user was at work when requesting the traffic information.

The past user activity data 410 may also include event data indicating occurrence of one or more events when the user provided the user request or in response to which the provided the user request. The event data may be related to events that occurred within a predefined time period of the past user request, for example, within minutes of the past user request. The event data may also be related to an on-going event, such as, a holiday, a sporting event, etc. For example, first event data associated with the first past user request for traffic information may indicate that the user request was received in response to the user slowing down while driving. Such event data may be determined using sensor data associated with the user's vehicle or device(s) proximate to the user. As another example, second event data associated with the second past user request for traffic information may indicate that the user request was received when the user entered his vehicle or upon turning on his vehicle.

The past user activity data 410 may also include other data can be used by the prediction component 420 to predict when the system can expect the particular type of user requests. For example, the past user activity data 410 may also include user device information, user type information, user profile information, video source type, device type, etc. The system may determine which past user activity data 410 to use to determine the prediction model based on the intent (as determined by the NLU component 260) corresponding to the past user requests.

The prediction component 420 may also process user preferences data 412 to determine the prediction model to predict when the system(s) 120 may receive the user request requiring image analysis. The user preferences data 412 may include user-selected/provided data indicating when the user prefers to receive particular information. For example, the user may have indicated that he prefers to hear the news when he enters the home in the evening or that he prefers to listen to traffic information before leaving work in the evening.

The prediction component 420 may determine multiple prediction models, each corresponding to a particular user request type. For example, the prediction component 420 may determine a first prediction model to predict when the system may receive a user request relating to traffic information. a second prediction model to predict when the system may receive a user request relating to the Panda Cam, a third prediction model to determine when the system may receive a user request relating to images captured by user's home device(s), and so on. The prediction component 420 may process the past user activity data 410 and user preferences data 412 that relate to the particular user request type to determine the corresponding prediction model.

The prediction component 420 may employ one or more machine learning models to process the past user activity data 410 and the user preferences data 412 to determine the prediction model to predict when the system(s) 120 may receive the user request requiring image analysis. The machine learning model(s) may include neural network models, deep learning models, probabilistic models, statistical models, regression models, and other types of inference models. The machine learning model(s) may be trained using training data, where the training data may be associated with multiple users and may include past user requests from multiple users and corresponding user activity data (e.g., timestamp data, location data, event data, etc.). During runtime, the machine learning model(s) may be configured to process data associated with the user 5 and predict when a user request from user 5 can be expected by the system(s) 120.

Various machine learning techniques may be used to train and operate models employed by the prediction component 420. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In some embodiments, the prediction component 420 may employ a separate machine learning model for each type of data that is processed. For example, the prediction component 420 may use a first machine learning model to process the timestamp data to predict a likelihood of when the system may receive the user request based on the current time. The prediction component 420 may use a second machine learning model to process the location data to predict a likelihood of when the system may receive the user request based on the user's location. The prediction component 420 may use a third machine learning model to process the event data to predict a likelihood of when the system may receive the user request based on occurrence of an event.

The prediction component 420 may output model data 425 indicating a likelihood of receiving a user request requiring image analysis. The model data 425 may be a score or a probability indicating how likely it is that the system receives a user request requiring image analysis. The model data 425 may indicate a likelihood of receiving a user request in relation to multiple factors, such as time, location, event data, etc. For example, the model output data 425 may indicate that there is 70% chance that the system will receive the user request for traffic information on Monday at 8 am, when the user is at home, and when the user turns on his car. In other embodiments, the model data 425 may indicate separate likelihoods for different factors. For example, the model data 425 may indicate that there is 70% chance that the system will receive the user request for traffic information at 8 am on Monday, a 30% that the system will receive the user request for traffic information when the user is at home, a 65% chance that the system will receive the user request for traffic information when the user enters his vehicle, etc.

The prediction component 420 may determine pattern data using the data from the profile storage 270. The prediction component 420 may be configured to process the past user activity data 410 to determine a user pattern indicating when a user may provide a particular user request type. The prediction component 420 may perform statistical analysis using the past user activity data 410 relating to the particular user request type to determine a pattern with respect to time, that is, when users typically provide the user request. The prediction component 420 may also perform statistical analysis to determine a pattern with respect to location, that is, where are users typically located when providing the user request. The prediction component 420 may also perform statistical analysis to determine a pattern with respect to event occurrence, that is, which event or type of event occurred when users typically provide the user request. For example, the prediction component 420 may determine a pattern indicating that users typical request traffic information between 7 am to 9 am and 4 pm to 6 pm (e.g., rush hour traffic) for their commute. In another example, the prediction component 420 may determine a pattern indicating that users typical request traffic information when they encounter heavy traffic while driving.

The image analytics component 285 may be configured to determine if image analysis should be initiated (using decision component 428). The component 428 may receive the model data 425 and input data 426. The input data 426 may include data representing the present context/situation/conditions relating to the device 110 and/or the user 5 that can be used to determine if the present situation should be used to initiate image analysis. For example, the input data 426 may include the present time or present timestamp data (e.g., 8 am on Monday; Jan. 15, 2019, 8 am on Monday; etc.), present location of the user (e.g., GPS coordinates, address, user-provided location name, etc.), present event data (e.g., occurrence of an event, on-going event, etc.). The component 428 may process the model data 425 and the input data 426 to determine whether the input data 426 indicates a trigger to initiate image analysis. For example, the model data 425 may indicate that there is a 70% chance that the system will receive the user request for traffic information at 8 am on Monday and the input data 426 may indicate that it is 7:45 am on Monday. The component 428 may determine that the timestamp indicated by the input data 426 is within a threshold of the timestamp indicated by the model data 425, and the probability of receiving a user request for traffic is high (70% chance), so image analysis should be initiated. Thus, the component 428 may determine if the input data 426 meets a condition or threshold with respect to the data represented by the model data 425, and the component 428 may also determine if there is high probability of receiving a user request with respect to the data represented/indicated by the input data 426.

As another example, the model data 425 may indicate that there is a 65% chance that the system will receive the user request for traffic information after the user enters his vehicle and the input data 426 may indicate the user entered his vehicle (occurrence of an event). The component 428 may determine that the probability of receiving a user request for traffic is high (65% chance) in response to the occurrence of the event, so image analysis should be initiated.

In some embodiments, the input data 426 is received by the image analytics component 285 because another component (e.g., orchestrator 230, device 110, etc.) sent the input data 426 to the image analytics component 285 (e.g., in a push model). In other embodiments, the image analytics component 285 may retrieve the input data 426 periodically to determine if a trigger to initiate image analysis occurred (e.g., in a pull model).

If the component 428 determines to trigger image analysis, then it may send a signal to the image analysis component 430. If the component 428 determines to not trigger image analysis, then the image analytics component 285 may continue to receive input data 426 and/or may continue to determine or update the prediction model using the prediction component 420.

The image analysis component 430 may be configured to perform computer vision processing on image data received from/retrieved from the image source(s) 125. In some embodiments, the image analysis component 430 may employ multiple computer vision algorithms, each configured to process different types of images and/or to determine different types of feature data. For example, a first computer vision algorithm may be configured to process images from traffic cameras and to determine feature data corresponding to traffic information (e.g., congestion on roads using the number of vehicles in the image data, speed of the vehicles to determine traffic flow, etc.). A second computer vision algorithm may be configured to process images from the Panda Cam to determine feature data corresponding to motion or movement. A third computer vision algorithm may be configured to process images from home device(s) to determine feature data corresponding to motion or movement within the home, facial recognition, object identification, etc.

The image analysis component 430 may be configured to select the appropriate image source 125 to respond to the user request. In some embodiments, the image analysis component 430 may receive and process intent data and slot data from the NLU component 260 to determine which image source 125 to retrieve image data from.

The image analysis component 430 may be configured to select the appropriate computer vision algorithm to respond to process the image data and to respond to the user request. In some embodiments, the image analysis component 430 may receive and process intent data and slot data from the NLU component 260 to determine which computer vision algorithm to use to determine feature data that may be used to generate output data responsive to the user input.

The image analysis component 430 may process the image data retrieved from the image source to determine the feature data 432. The feature data 432 may include data quantitative information corresponding to the image data; qualitative information corresponding to the image data; size, color, shape of an object represented in the image data; classification of the image data; classification of an object represented in the image data; etc. The feature data 432 may represent data that facilitates event detection within the image data, scene reconstruction with respect to the image data, object recognition within the image data, video tracking, motion estimation, image restoration, etc.

In some embodiments, the image analysis component 430 may analyze image data using algorithms and features provided by Amazon Rekognition. The image analysis component 430 may provide the image data to an API provided by the Rekognition service to identify objects, people, text, scenes, and activities. Using Amazon Rekognition, the image analysis component 430 may identify thousands of objects (e.g. bike, telephone, building) and scenes (e.g. parking lot, beach, city). When analyzing video data, the image analysis component 430 may also identify specific activities happening in the frame, such as "delivering a package" or "playing soccer." The image analysis component 430 may also be able to analyze motion and movement of objects, for example, the system may use the movement of athletes during a game to identify plays for post-game analysis.

The image analysis component 430 may search image data and identify a person in a photo or video using a private repository of face images. The image analysis component 430 may analyze the attributes of faces in images and videos to determine things like happiness, age range, eyes open, glasses, facial hair, etc. In video, the image analysis component 430 may also measure how these things change over time, such as constructing a timeline of the emotions expressed by an actor. The image analysis component 430 may detect and recognize text from images, such as street names, captions, product names, license plates, etc.

In non-limiting examples, the image analysis component 430 may use computer vision algorithms to determine traffic information by analyzing images or video from traffic cameras, for example, by counting the number of vehicles on the road, determining the speed of the vehicles on the road, etc. The image analysis component 430 may use computer vision algorithms to determine inventory in a user's home (e.g., fridge, pantry, cabinets, etc.) or in warehouse by analyzing images or video representing objects in the user's home or the warehouse and by identifying particular objects and text. For example, the image analysis component 430 may determine that the user has milk, yogurt, orange juice, etc. in the fridge, but does not have eggs and butter. The image analysis component 430 may use computer vision algorithms to determine quality of certain items, such as, plants at the user's home or groceries in the user's fridge. For example, the image analysis component 430 may analyze images representing the plants or groceries over time and determine their quality based on color, shape, and other data, and determine whether the plant is healthy, whether the plant is flowering, whether the tomatoes in the fridge are still good/have expired, etc. The image analysis component 430 may use computer vision algorithms to determine whether a particular person is at home by analyzing the image data to recognize the person's face. For example, the user may want to know if the user's child is home, and the image analysis component 430 may analyze image data from a home security camera to determine if the child is at home.

The output generation component 440 may process the feature data 432 to determine output data 450 responsive to the user request. In some embodiments, the output generation component 440 may receive and process intent data and slot data from the NLU component 260 to determine the type and format of the output data 450.

The output data 450 may be visual data, textual data, synthesized speech data, or the like. The output generation component 440 may employ a number of techniques to generate the output data 440, such as, natural language generation (NLG) processing, TTS processing and the like. Based on the type of output data 440, the orchestrator 230 may select the appropriate device type for output. For example, the orchestrator 230 may select a device with a display if the output data 450 includes visual data and/or textual data and may select a device with a speaker if the output data 450 include synthesized speech.

The output generation component 440 may include a NLG system, which may be employ a trained model, such as a neural network, to generate output text data in a natural language, and, in some embodiments, includes words and/or phrases specifically formatted for the user providing the input. The NLG system may process the feature data 432 determined by the image analysis component 430 to determine a natural language representation of the feature data 432. As opposed to using templates to formulate responses, the NLG system may include models trained from the various templates for forming the output text data (output data 450). For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, text data representing the user input, user preferences, user profile data, etc.

The NLG system may generate output data 450 based on one or more response templates. The NLG system may select a template in response to the user input, "what is the traffic currently like" of the form: "the traffic currently is <traffic information derived from image analysis>." The NLG system may analyze the logical form of the template to produce one or more textual responses including markups and annotations to familiarize the response that is generated. Audio data representing the output data generated by the NLG system may then be generated using TTS processing.

The system may initiate image analysis using a computer vision algorithm, determine feature data corresponding to the image data, and perform output generation, for example, using the NLG system to determine the output data 450, in anticipation of receiving the user input. In some embodiments, the image analytics component 285 may determine that the generated output data 450 has expired based on the image source 435 refreshing or updating the corresponding image data, or based on the time elapsed since the output data 450 was generated. For example, the system may trigger analysis of image data from a traffic camera in anticipation of the user request "how's the traffic", and may generate output data describing the traffic at a first time. At a second time after the first time, the traffic camera may capture additional image data of the traffic, and the output data generated at the first time no longer reflects the traffic at the second time. Alternatively, the system may determine that a certain amount of time, e.g., 5 minutes, has elapsed since the output was generated at the first time, and the system has not yet received the user input. In both cases, the system may retrieve the current image data from the traffic camera, perform image analysis, and determine the output data 450 reflecting the more current traffic. The updated output data 450 may be stored and provided to the user in response to the user input.

In an example embodiment, the output generation component 440 may determine that a summary of the image data is responsive to the user request. For example, the output generation component 440 may generate the output data 450 indicating that traffic information derived from the feature data 432, such as the traffic is normal/light/heavy/medium, there are no accidents, the travel speed is normal/slow, etc.

In another embodiment, the output generation component 440 may determine that the image data is responsive to the user request, and may provide that for display at the device 110. For example, the user may request information related the Panda Cam, and the output generation component 440 may annotate the video feed from the Panda Cam and provide it to the device 110 to display to the user.

In some embodiments, the image analysis component 430 may determine processing latency data indicating the latency in executing a particular computer vision algorithm. The image analysis component 430 may provide the processing latency data associated with a particular computer vision algorithm to the component 428. The component 428 may also use the processing latency data to determine if the image analysis should be triggered. For example, the processing latency data may indicate that using a computer vision algorithm to analysis traffic camera images to respond to a user request requires approximately 1 to 3 minutes. Based on this processing latency, the component 428 may determine to initiate image analysis in advance (at least 1 to 3 minutes in advance) of when a user request is expected by the system(s) 120, so that the feature data 432 is available to generate the output data 450.

In a non-limiting example, the image analytics component 285 may determine that the user requests a summary of the information represented in the image data from the image source 125 every day. For example, the system(s) 120 may receive on a daily basis the user request "how is the panda at the National Zoo?" The image analytics component 285 may process the image data retrieved from the Panda Cam, in advance of the user request, where the image data may be the video feed from the Panda Cam for the past 24 hours.

In some embodiments, the image analytics component 285 may be configured to process image data based on an event detected within the image data retrieved from the image source(s) 125. For example, the image source 125 may be the Panda Cam, and the image data retrieved from the Panda Cam may indicate that the panda is performing a particular activity (event detection). In response to detecting the event in the image data, the image analytics component 285 may initiate image analysis via the component 430.

Figure 5:
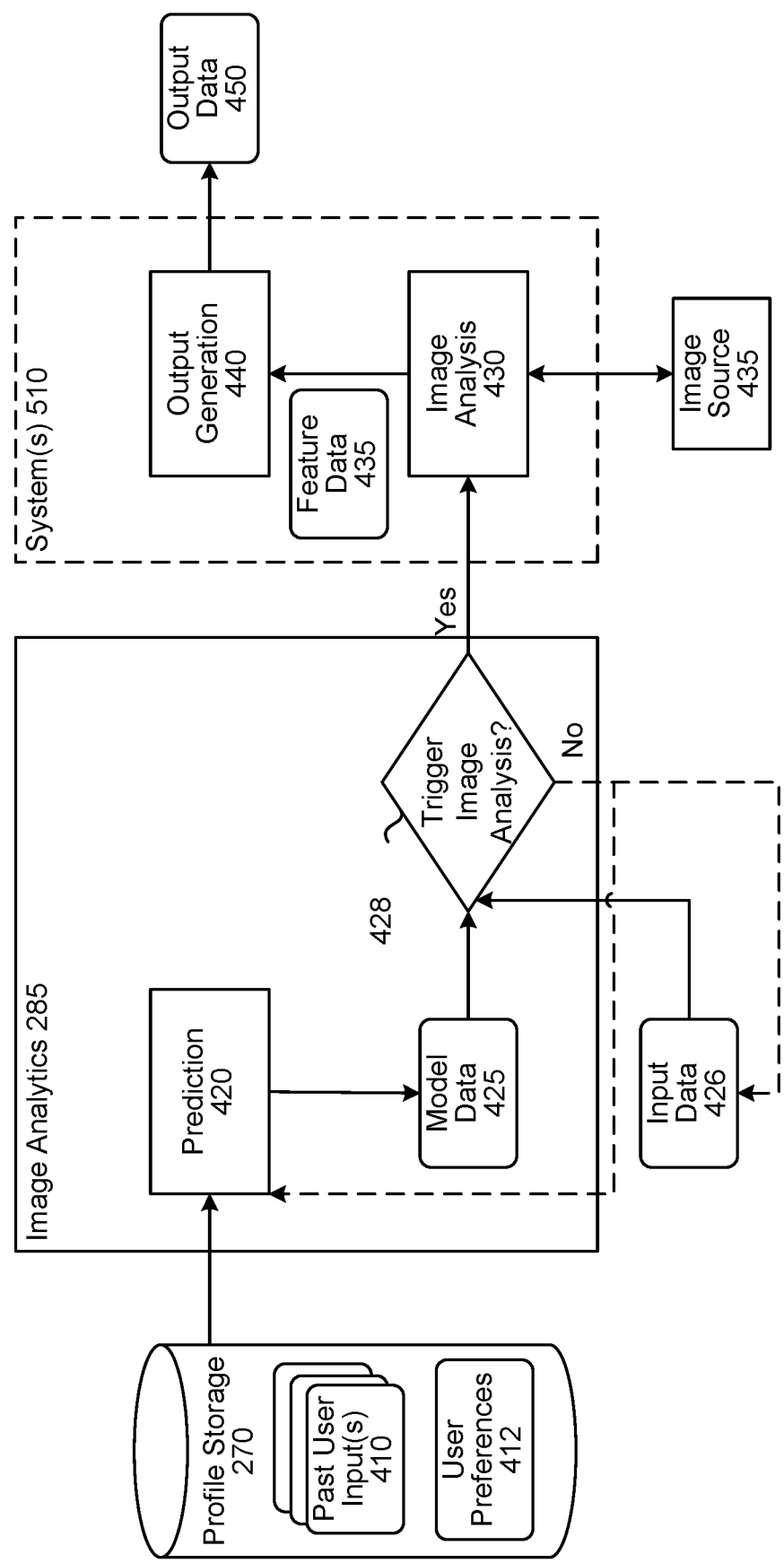
FIG. 5 is a conceptual diagram illustrating another configuration of the image analytics components according to embodiments of the present disclosure.

FIG. 5 is a conceptual diagram illustrating another configuration of the image analytics components according to embodiments of the present disclosure. As shown in FIG. 5, the image analytics component 285 may include the prediction component 420 and the decision component 428, which may be configured as described above with relation to FIG. 4. The image analysis component 430 and the output generation component 440 may be included in system(s) 510 and may be configured as described above with relation to FIG. 4. The system(s) 510 may be separate from the system(s) 120. It should be understood that depending the system configuration, the components described in relation to FIG. 4 may be included in different systems.

Figure 6:
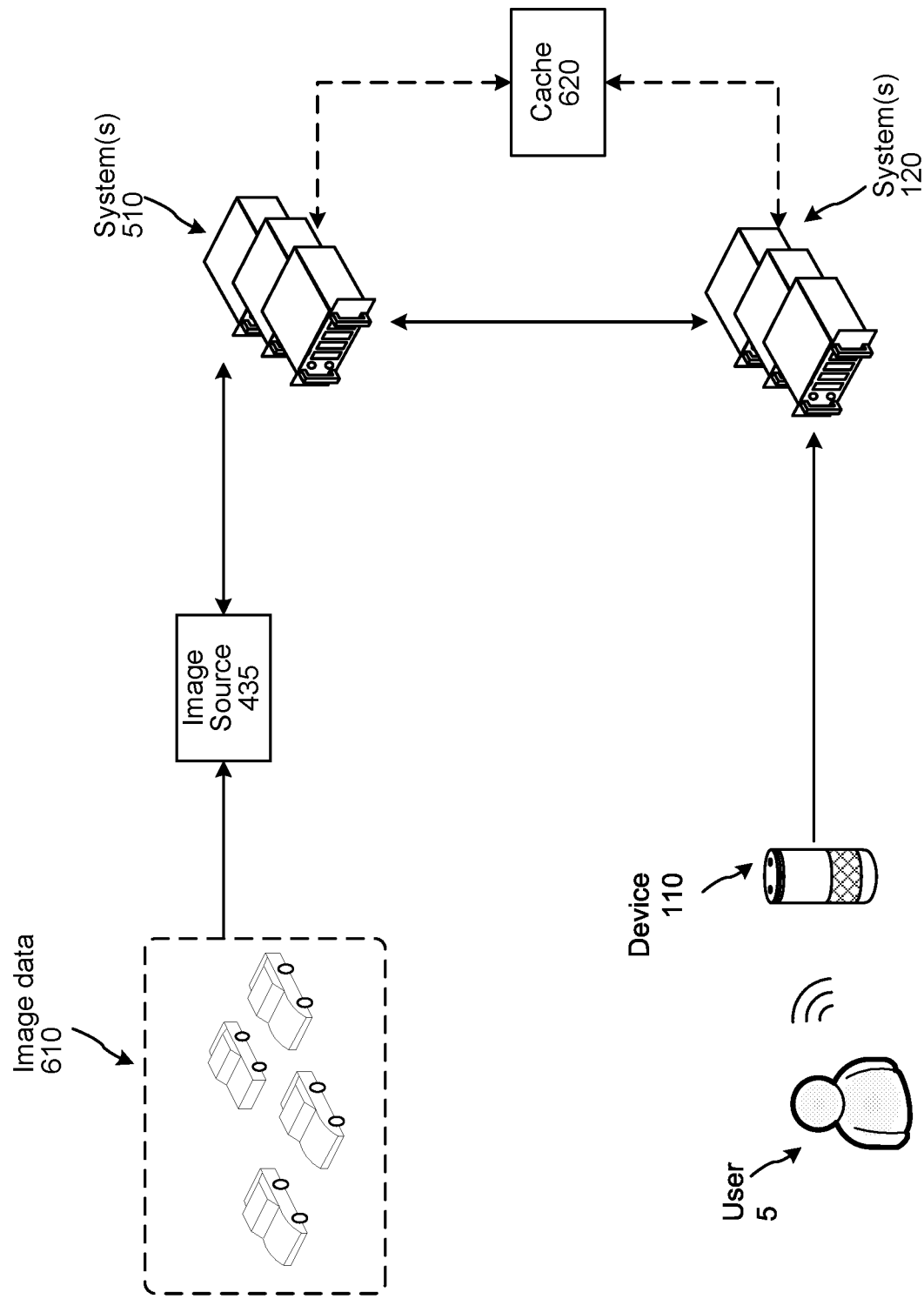
FIG. 6 is a conceptual diagram illustrating another configuration of the image analytics components according to embodiments of the present disclosure.

FIG. 6 is a conceptual diagram illustrating another configuration of the image analytics components according to embodiments of the present disclosure. As shown in FIG. 6, the user 5 may provide user input via the device 110. The system(s) 120 may process the user input as described herein to determine the user's intent to receive information relating to image data 610 captured by an image source, for example, image source 435. As illustrated, the image data 610 may represent traffic information. The system(s) 510 may include the image analysis component 430 and the output generation component 440. The system may also include a cache 620 to store feature data/image data for frequently requested information. For example, if multiple users are requesting traffic information from a particular image source 435, and the image source 435 refreshes or updates every 5 minutes, then the system(s) 120 or 510 (depending on system configuration) may retrieve feature data from the cache 620, in between the image source refreshing the image data, to provide an output to the user input. The system may store data identifying the feature data stored in the cache 620, such as an image source identifier, the last time the image data was updated, the time the feature data was stored in the cache, etc. For example, the system(s) 120 may determine that 100 users may be requesting traffic information from the particular traffic source (based on analysis of past user activity), may store analyzed traffic data/output data corresponding to the traffic information from the particular traffic source in the cache 620, and then retrieve the traffic information from the cache 620 to respond to incoming user requests.

Figure 7:
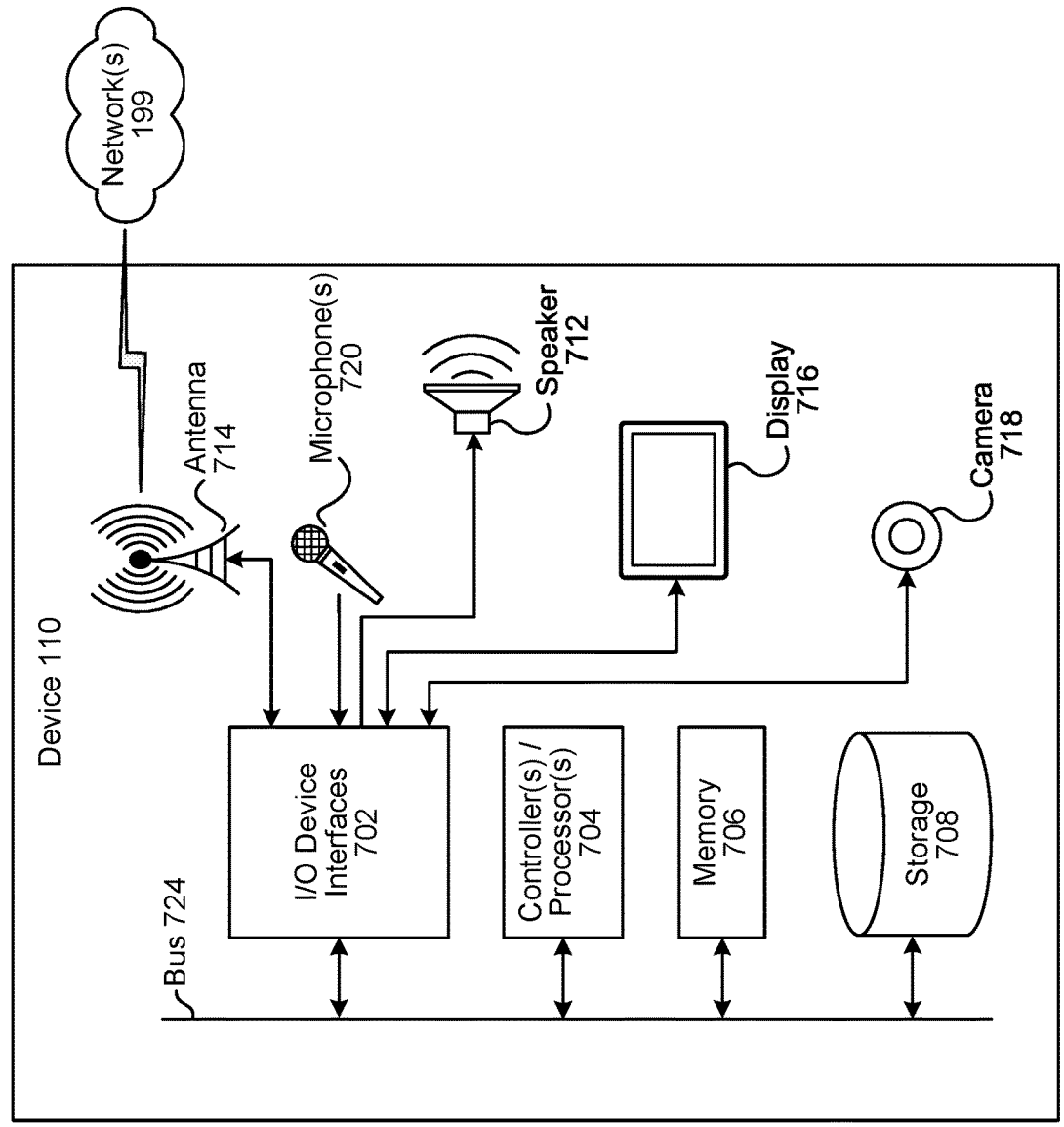
FIG. 7 is a block diagram conceptually illustrating example components of a device according to embodiments of the present disclosure.
Figure 8:
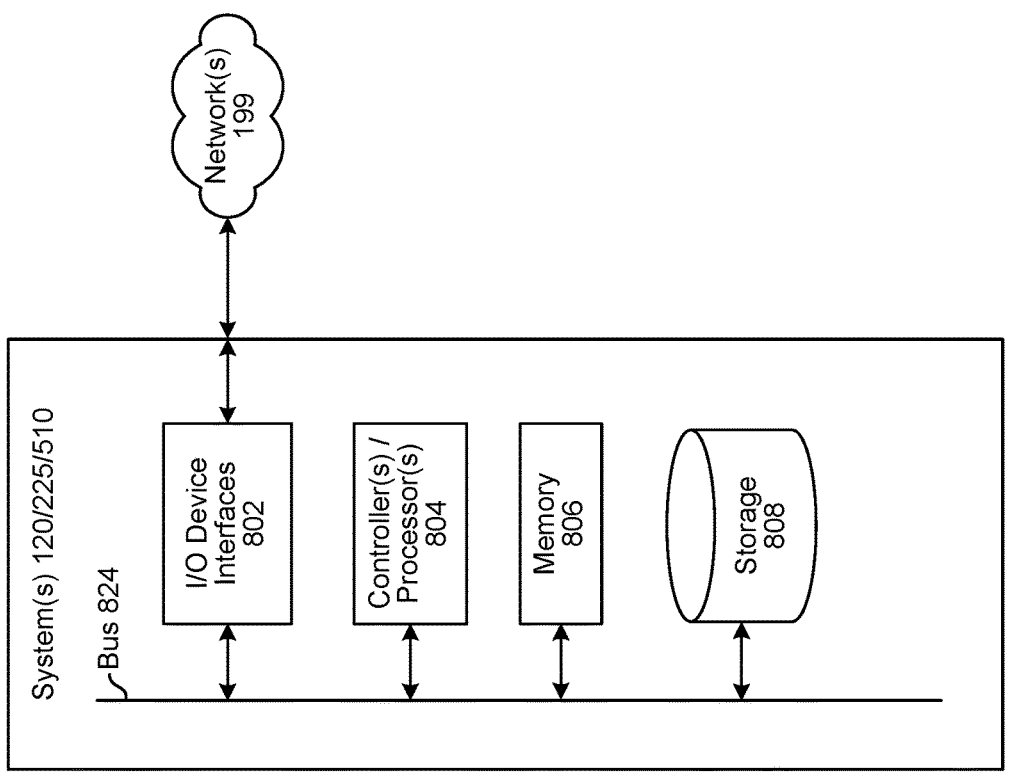
FIG. 8 is a block diagram conceptually illustrating example components of a server according to embodiments of the present disclosure.

FIG. 7 is a block diagram conceptually illustrating a device 110 that may be used with the system. FIG. 8 is a block diagram conceptually illustrating example components of a remote device, such as the system(s) 120, which may assist with ASR processing, NLU processing, etc., and the skill system(s) 225. A system (120/225/510) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225/510) may be included in the overall system of the present disclosure, such as one or more systems 120 for performing ASR processing, one or more systems 120 for performing NLU processing, one or more skill systems 225 for performing actions responsive to user inputs, one or more systems 510 for performing image analysis, etc. In operation, each of these systems may include computer-readable and computer-executable instructions that reside on the respective device (120/225/510), as will be discussed further below.

Each of these devices (110/120/225/510) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/225/510) may also include a data storage component (708/808) for storing data and controller/processor-executable instructions. Each data storage component (708/808) may individually include one or more non-volatile storage types such as magnetic storage, optical storage, solid-state storage, etc. Each device (110/120/225/510) may also be connected to removable or external non-volatile memory and/or storage (such as a removable memory card, memory key drive, networked storage, etc.) through respective input/output device interfaces (702/802).

Computer instructions for operating each device (110/120/225/510) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/225/510) includes input/output device interfaces (702/802). A variety of components may be connected through the input/output device interfaces (702/802), as will be discussed further below. Additionally, each device (110/120/225/510) may include an address/data bus (724/824) for conveying data among components of the respective device. Each component within a device (110/120/225) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the system(s) 120, the skill system(s) 225 or the system(s) 510 may include their own dedicated processors, memory, and/or storage. Alternatively, one or more of the components of the device(s) 110, the system(s) 120, the skill system(s) 225 or the system(s) 510 may utilize the I/O interfaces (702/802), processor(s) (704/804), memory (706/806), and/or storage (708/808) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, the skill system(s) 225 and the system(s) 510, as described herein, are illustrative, and may be located as a stand-alone device or may be included, in whole or in part, as a component of a larger device or system.

Figure 9:
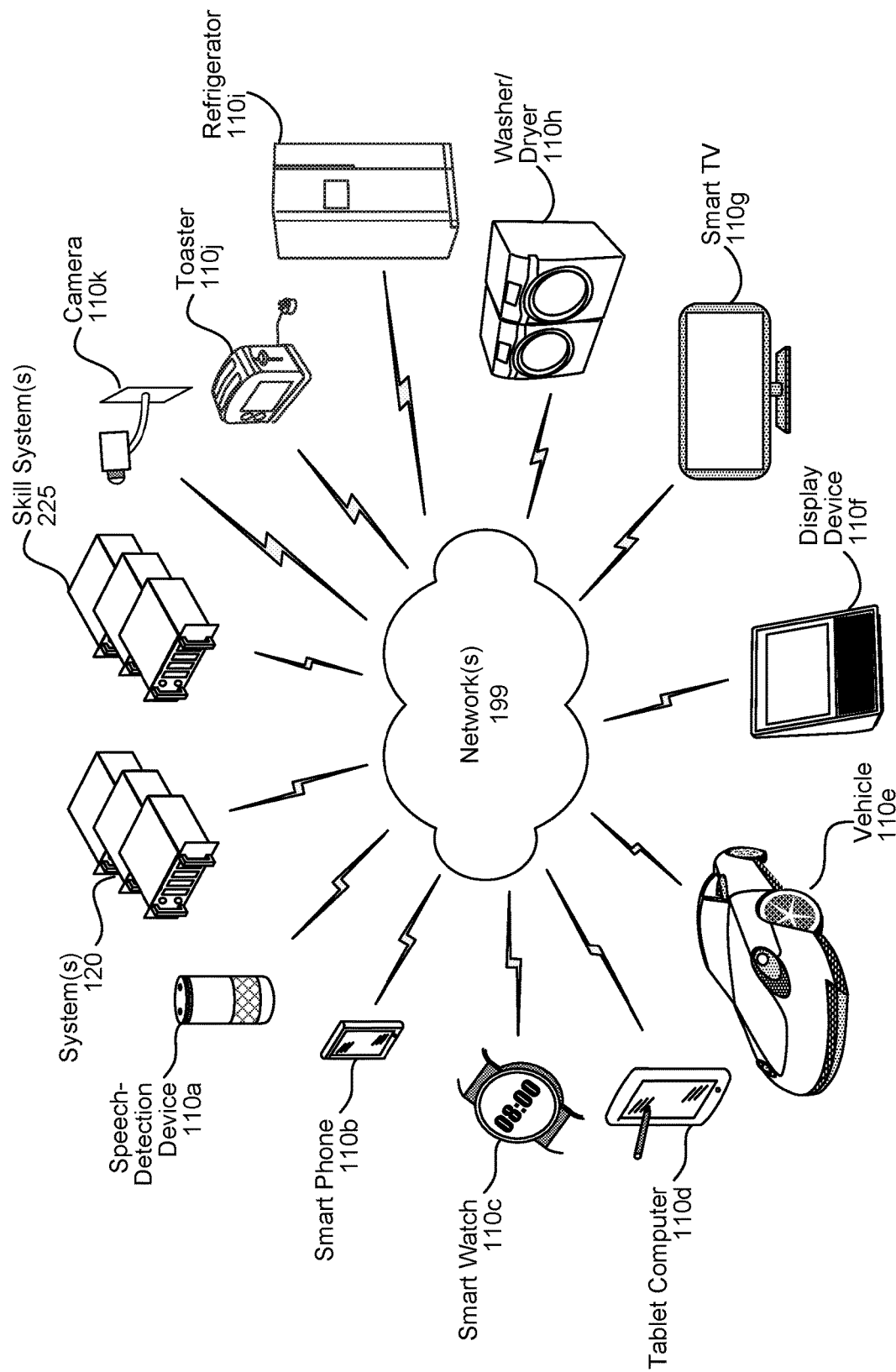
FIG. 9 illustrates an example of a computer network for use with the speech processing system.

As illustrated in FIG. 9, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j and/or a camera 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120. Data captured by the networked devices 110 may be used by the system(s) 120 to determine user behavior and predict when the user may provide a user input requiring image analysis (e.g., by the prediction component 420). Data captured by the networked devices 110 may also be used to determine a trigger to initiate image analysis (e.g., as the input data 426 by the component 428).

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
during a first time period:
receiving, from a device, a first user input;
processing the first user input to determine an intent to receive first information;
identifying a video source device associated with the first information;
retrieving first video data from the video source;
performing computer vision processing on the first video data to determine first feature data;
determining first output data responsive to the first user input, the first output data representing a natural language representation of the first feature data; and
sending, to the device, the first output data;
during a second time period after the first time period:
determining user history data associated with the intent, the user history data indicating a first time when the first user input was received and a second time when a second user input corresponding to the intent was received;
determining, using the user history data, a likelihood of receiving a user input corresponding to the intent after the second time period;
retrieving second video data from the video source;
performing computer vision processing using the second video data to determine second feature data; and
determining second output data representing a natural language representation of the second feature data; and during a third time period after the second time period:
receiving, from the device, a third user input;
determining that the second output data is responsive to the third user input; and
sending, to the device, the second output data.

2. The computer-implemented method of claim 1, wherein determining the likelihood of receiving the user input after the second time period comprises:
processing the user history data to determine pattern data, wherein the user history data includes first location data associated with the first user input, second location data associated with the second user input, first event data associated with the first user input and second event data associated with the second user input; receiving event data from the device; and
processing, using a trained model, the event data and the pattern data to determine the likelihood.

3. The computer-implemented method of claim 1, further comprising:
determining second model data using a second trained model, wherein the second trained model is configured to predict a likelihood of receiving a user request for second information derived from a second video source;
processing the second model data to determine that a user input corresponding to the intent is likely to be received;
retrieving third video data from the second video source;
performing computer vision processing using the third video data to determine third feature data;
determining, using the third feature data, third output data;
receiving, from a second device, a fourth user input;
determining that the third output data is responsive to the fourth user input; and
sending the third output data to the second device.

4. A computer-implemented method comprising:
receiving input data;
determining first user history data associated with past user inputs corresponding to an intent requiring processing of video data, the past user inputs associated with a first user profile, wherein the first user history data includes a first time when at least a first past user input corresponding to the intent was received and a second time when at least a second past user input corresponding to the intent was received;
processing the input data and the first user history data to determine trigger data representing a likelihood of receiving a user input in the future corresponding to the intent;
determining, from the trigger data, to initiate processing of the video data;
determining output data corresponding to the intent and representing the video data;
receiving, from a device, a first user input associated with the first user profile;
determining that the output data is responsive to the first user input; and
sending, to the device, the output data.

5. The computer-implemented method of claim 4, wherein processing the input data and the first user history data to determine the trigger data comprises processing, using a trained model, the first user history data and the input data to determine the trigger data.

6. The computer-implemented method of claim 4, further comprising:
determining a video source corresponding to the video data; and
performing computer vision processing on the video data to determine feature data, and
wherein determining the output data comprises:
determining, using the feature data, text data associated with a portion of the video data,
determining, using the feature data, summary data associated with the video data, and
determining the output data using the text data or the summary data.

7. The computer-implemented method of claim 4, further comprising:
determining second user history data associated with past user inputs corresponding to the intent, wherein the second user history data includes first event data indicating occurrence of an event when a third past user input corresponding to the intent was received and second event data indicating occurrence of the event when a fourth past user input corresponding to the intent was received, and
wherein receiving the input data comprises receiving the input data from a second device associated with the first user profile, the input data indicating occurrence of the event, and
wherein processing the input data to determine the trigger data comprises processing, using a trained model, the first user history data, the second user history data, and the input data to determine the trigger data.

8. The computer-implemented method of claim 4, further comprising:
determining second user history data associated with past user inputs corresponding to the intent, wherein the second user history data includes a first location associated with a third past user input corresponding to the intent and a second location with a fourth past user input corresponding to the intent, the third past user input being associated with a second user profile and the fourth user past user input being associated with a third user profile, and
wherein receiving the input data comprises receiving location data associated with the first user profile, and
wherein processing the input data to determine the trigger data comprises processing, using a trained model, the first user history data, the second user history data, and the input data to determine the trigger data.

9. The computer-implemented method of claim 4, further comprising prior to receiving the input data:
determining a video source corresponding to the intent;
retrieving prior video data from the video source;
performing computer vision processing using the prior video data; and
determining latency data representing a processing latency associated with computer vision processing of the prior video data, wherein determining to initiate processing of the video data comprises determining that the latency data represents the trigger data.

10. The computer-implemented method of claim 4, further comprising:
   determining, using the intent, a video source to retrieve the video data from;
   determining a timestamp indicating when the output data was generated;
   determining, using the timestamp, that the output data has expired;
   prior to receiving the first user input from the device, retrieving second video data from the video source; and
   determining second output data corresponding to the intent and the second video data; and
   sending the second output data to the device in response to receiving the first user input.

11. The computer-implemented method of claim 4, wherein determining that the output data is responsive to the first user input comprises determining that the first user input corresponds to using a first computer vision algorithm to process the video data, and
   determining that the video data was processed using the first computer vision algorithm to determine the output data.

12. The computer-implemented method of claim 4, further comprising:
   determining second model data using a second trained model, wherein the second trained model is configured to predict a likelihood of receiving a user input for second information derived from a second video source;
   processing the second model data to determine that a user input corresponding to the second information is likely to be received;
   retrieving second video data from the second video source;
   performing computer vision processing using the second video data to determine second feature data;
   determining, using the second feature data, second output data;
   receiving, from the device, a second user input;
   determining that the second output data is responsive to the second user input; and
   sending the second output data to the device.

13. A system comprising:
   at least one processor; and
   at least one memory including instructions that, when executed by the at least one processor, cause the system to:
      receive input data;
      determine first user history data associated with past user inputs corresponding to an intent requiring processing of video data, the past user inputs associated with a first user profile, wherein the first user history data includes a first time when at least a first past user input corresponding to the intent was received and a second time when at least a second past user input corresponding to the intent was received;
      process the input data and the first user history data to determine trigger data representing a likelihood of receiving a user input in the future corresponding to the intent;
      determine, from the trigger data, to initiate processing of the video data;
      determine output data corresponding to the intent and the representing the video data;
      receive, from a device, a first user input associated with the first user profile;
      determine that the output data is responsive to the first user input; and
      send, to the device, the output data.

14. The system of claim 13, wherein processing the input data and the first user history data to determine the trigger data comprises processing, using a trained model, the first user history data and the input data to determine the trigger data.

15. The system of claim 13, wherein the instructions that, when executed by the at least one processor, further cause the system to:
   determine a video source corresponding to the video data; and
   perform computer vision processing on the video data to determine feature data, and
   wherein the instructions that cause the system to determine the output data further cause the system to:
      determine, using the feature data, text data associated with a portion of the video data;
      determine, using the feature data, summary data associated with the video data; and
      determine the output data using the text data or the summary data.

16. The system of claim 13, wherein the instructions that, when executed by the at least one processor, further cause the system to:
   determine second user history data associated with past user inputs corresponding to the intent, wherein the second user history data includes first event data indicating occurrence of an event when a third past user input corresponding to the intent was received and second event data indicating occurrence of the event when a fourth past user input corresponding to the intent was received, and
   wherein the instructions that cause the system to receive the input data further cause the system to receive the input data from a second device associated with the first user profile, the input data indicating occurrence of the event, and
   wherein the instructions that cause the system to process the input data to determine the trigger data further cause the system to process, using a trained model, the first user history data, the second user history data, and the input data to determine the trigger data.

17. The system of claim 13, wherein the instructions that, when executed by the at least one processor, further cause the system to:
   determine second user history data associated with past user inputs corresponding to the intent, wherein the second user history data includes a first location associated with a third past user input corresponding to the intent and a second location with a fourth past user input corresponding to the intent, the third past user input being associated with a second user profile and the fourth user past user input being associated with a third user profile, and
   wherein the instructions that cause the system to receive the input data causes the system to receive location data associated with the first user profile, and
   wherein the instructions that cause the system to process the input data to determine the trigger data cause the system to process, using a trained model, the first user history data, the second user history data, and the input data to determine the trigger data.

18. The system of claim 13, wherein the instructions that, when executed by the at least one processor, further cause the system to prior to receiving the input data:
determine a video source corresponding to the intent;
retrieve prior video data from the video source;
perform computer vision processing using the prior video data; and
determine latency data representing a processing latency associated with the computer vision processing of the prior video data, and
wherein the instructions that cause the system to determine to initiate processing of the video data further causes the system to determine that the latency data represents the trigger data.

19. The system of claim 13, wherein the instructions that, when executed by the at least one processor, further cause the system to:
determine, using the intent, a video source to retrieve the video data from;
determine a timestamp indicating when the output data was generated;
determine, using the timestamp, that the output data has expired;
prior to receiving the first user input from the device, retrieve second video data from the video source; and
determine second output data corresponding to the intent and the second video data; and
send the second output data to the device in response to receiving the first user input.

20. The system of claim 13, wherein the instructions that, when executed by the at least one processor, cause the system to determine that the output data is responsive to the first user input further cause the system to:
determine that the first user input corresponds to using a first computer vision algorithm to process the video data; and
determine that the video data was processed using the first computer vision algorithm to determine the output data.

* * * * *